(12) United States Patent
Knowles et al.

(10) Patent No.: US 6,465,936 B1
(45) Date of Patent: Oct. 15, 2002

(54) FLEXTENSIONAL TRANSDUCER ASSEMBLY AND METHOD FOR ITS MANUFACTURE

(75) Inventors: Gareth J. Knowles; Bruce L. Bower, both of Williamsport; Leslie E. Cross, University Park, all of PA (US)

(73) Assignee: QorTek, Inc., Williamsport, PA (US)

( * ) Notice: Subject to any disclaimer, the term of this patent is extended or adjusted under 35 U.S.C. 154(b) by 0 days.

(21) Appl. No.: 09/253,145

(22) Filed: Feb. 19, 1999

Related U.S. Application Data
(60) Provisional application No. 60/075,141, filed on Feb. 19, 1998.

(51) Int. Cl.⁷ ............................................. H01L 41/08
(52) U.S. Cl. ........................................ 310/328; 310/337
(58) Field of Search ..................... 310/328, 330–332, 310/337

(56) References Cited

U.S. PATENT DOCUMENTS

| | | | | |
|---|---|---|---|---|
| 4,051,455 A | * | 9/1977 | Fowler | 310/366 X |
| 4,706,230 A | * | 11/1987 | Inoue et al. | 310/337 X |
| 4,894,811 A | * | 1/1990 | Porzio | 310/337 X |
| 5,030,873 A | * | 7/1991 | Owen | 310/337 |
| 5,113,108 A | * | 5/1992 | Yamashita et al. | 310/328 |
| 5,166,908 A | * | 11/1992 | Montgomery | 310/328 X |
| 5,431,058 A | * | 7/1995 | Lagier et al. | 310/337 X |
| 5,497,357 A | * | 3/1996 | Dahlstrom et al. | 310/337 X |
| 5,508,976 A | * | 4/1996 | Pauer | 310/337 X |
| 5,668,432 A | * | 9/1997 | Tominaga et al. | 310/328 |
| 5,729,077 A | * | 3/1998 | Newnham | 310/328 |
| 5,798,600 A | * | 8/1998 | Sager et al. | 310/328 X |
| 5,900,691 A | * | 5/1999 | Reuter et al. | 310/328 X |

* cited by examiner

*Primary Examiner*—Mark O. Budd
(74) *Attorney, Agent, or Firm*—Cahn & Samuels, LLP

(57) ABSTRACT

A flextensional transducer assembly having a single flextensional cell with a transducer housed with a platten. The transducer expands and contracts in a transverse direction to cause inverse movement in the platten in the axial direction. The platten may include either an elbow at the intersection of walls or corrugated pattern along the top and bottom walls. The platten is manufactured from one piece using Electrical Discharge Machining. A load is applied to the platten to then slot in the transducer into the platten before releasing the load to mechanically capture the transducer.

17 Claims, 12 Drawing Sheets

| Driving voltage (V) | side displacement μm | Top displacement μm | Amplification factor (ideal 10) | Unloaded acuator displacement μm |
|---|---|---|---|---|
| Conventional platten design 40 | 9.21 | 51.42 | 5.58 | 12 |
| Conventional platten design 50 | 11.56 | 64.19 | 5.61 | 15 |
| Hinged-metal frame design 40 | 3.58 | 34.18 | 9.55 | 12 |
| Hinged-metal frame design 50 | 4.96 | 46.81 | 9.43 | 15 |

FIG.5

FLEXTENSIONAL TRANSDUCER ASSEMBLY AND METHOD FOR ITS MANUFACTURE

This application claims priority from provisional patent application No. 60/075,141 filed Feb. 19, 1998.

FIELD OF THE INVENTION

This invention relates to flextensional transducers and methods for making flextensional transducers. More particularly, this invention relates to specific implementations of flextensional transducers.

BACKGROUND OF THE INVENTION

In recent years piezoelectric and electrostrictive ceramics have been used in a number of actuator applications. A composite flextensional actuator was developed as discussed in U.S. Pat. No. 4,999,819 to R. E. Newnham et al. in an attempt to meet increase strain (throw).

The development of the "moonie" transducer in the late 1980's for hydrophone applications was discussed in an article by Q.C. Xu et al. entitled "Piezoelectric Composites with High Sensitivity and High Capacitance for use as High Pressure Sensors" published in IEEE Trans. on UFFC, vol. 38, issue 6, pp. 634–639 (1991). The moonie consists of a piezoceramic disk poled in the thickness direction sandwiched between two thick metal end caps. The shallow half moon shape of the machined inner surface of each of the metal end caps provides the "moonie" name. When acting as a sensor, the cavity incident axial direction stress is converted into larger radial and tangential stresses of opposite sign, thereby causing $d_{33}$ and $d_{31}$ coefficients of the ferroelectric material to add together (rather than subtract) as the effective $d_h$ of the device.

To overcome the issue of stress concentration in the region above the bonding layer, these devices were further refined. The end cap transformed into a shape of a musical cymbal; thus this end cap has been called a "cymbal." The cymbal cap is much thinner than a moonie cap, and is easier to manufacture. It operates in a similar fashion to the moonie with the exception that in addition to the displacement due to the flexural motion of the caps, the cymbal has an added contribution from rotational motion.

However, both of these designs share common limitations in force/throw for applications such as isolators, translators, and positioners. The moonie and cymbal end caps are not easily manufactured and require special fabrication tools whenever product dimensions are altered. The issue of bonding is particularly problematic, in that most adhesives do not fare well under cyclic loading, especially if additionally subjected to large temperature excursion. Bonding of flextensionals at room temperature for use in space and cryogenic filter applications is presently untenable.

The recent introduction of the Thunder process developed by NASA has eliminated some of these problems. However, the Thunder process fabricated actuators like conventional flextensional designs require special tooling for each individual size and shape. The Thunder process of manufacture is quite complex as a result of a multilayer CTE differential process using polyimide coatings, oven baking, and precision lapping of the layers.

An electromechanical transduction apparatus is disclosed in U.S. Pat. No. 4,845,688 to Butler. The Butler device includes a polygonal, oval, elliptical or concave actuator housing. Within the actuator housing is an opening with a similar cross-section for housing a flextensional transducer. The Butler device is only able to obtain an amplification factor of about four. When two Butler devices are stacked one on top of another, the bolting between them lowers the efficiency of transforming strain into motion so that there is not twice the movement of one Butler device.

Notwithstanding the usefulness of the above-described devices, a need still exists for a more efficient device for converting strain in one direction into movement (or force) in a second direction. Furthermore, an easier manufacturing method is needed to fabricate these devices.

SUMMARY OF THE INVENTION

The invention generally relates to the design, implementation and manufacture of a near-ideal electromechanical amplification apparatus primarily embodied as a flextensional mechanism that may be used for hydraulic, isolation, pump and stretched fiber applications among others. The apparatus of the present invention may be used individually or in tandem, as with the tunable fiber laser, to create mechanical motions. A feature of the invention, is the ability to provide unidirectional free motion axially through the apparatus when driven by piezoelectric, electrostrictive or magnetostrictive means. The concept of the current invention also allows for near ideal amplification or double amplification using a corrugated platten system. The apparatus of the present invention may also integrate the drive electronics within its design using a piezo-microdrive apparatus.

Another feature of the invention is the ability to provide self-contained flextensional mechanisms consisting of the primary embodiment incorporating this transversal embedded electronics driver.

DESCRIPTION OF THE DRAWINGS

FIG. 5 depicts a comparison between the two embodiments.

DETAILED DESCRIPTION OF THE EMBODIMENTS

In accordance with the present invention, there is now described herein a number of embodiments for practicing the invention. In accordance with one aspect of the invention there is provided a flextensional transducer assembly that may comprise a single or multiple cell configuration preferably fabricated from a single piece of material. Like traditional flextensional transducer assemblies, the flextensional assemblies of the invention expand and contract responsive to changes in voltage. However, the flextensional transducer assembly is preferably unitary in final form having no disconnections and needing no secondary mechanisms such as bolts, bonding materials or clamps to hold the assembly together to promote maximum strain transfer upon flexure.

Figure 1A:
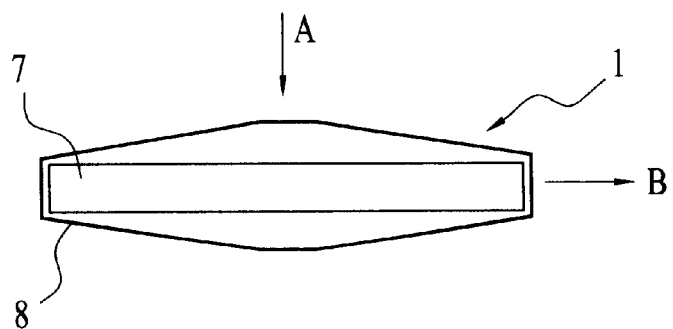
FIGS. 1A and 1B illustrate a preferred embodiment of the invention.
Figure 1B:
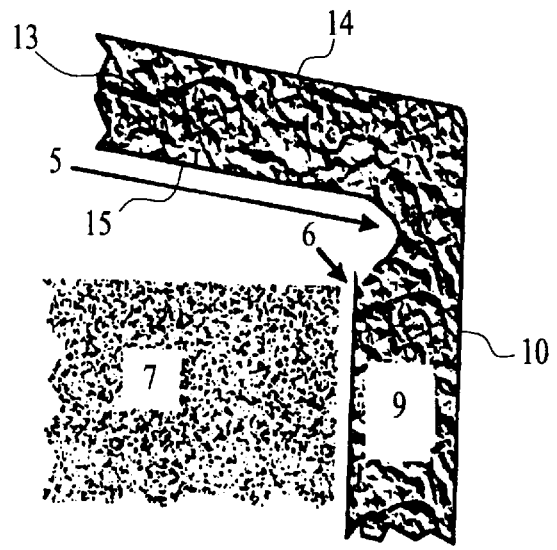

FIG. 1A depicts an embodiment of a flextensional transducer assembly in accordance with the invention. Here the flextensional transducer assembly comprises a single flextensional cell 1 having a driver (transducer) element 7 disposed within a platten or housing 8. In accordance with a preferred feature of the invention, the platten 8 may be provided with a plurality of hinge points as illustrated in FIG. 1B. As shown, platten 8 includes sidewalls 9 each having inner and outer surfaces 11, 12. Platten 8 further comprises a top wall 13 and a bottom wall (not shown in FIG. 1B) each having inner and outer surfaces 14, 15. The inner surface 15 of top wall 13 and the inner surface 11 of sidewall 9 converge to form a hinge point such as elbow 5. Likewise, an elbow 5 is preferably formed at each intersection of a sidewall 9 with top and bottom walls 13.

Driver element 7 is driven by a voltage to be displaced in a direction parallel to the transverse axis B of FIG. 1A. This displacement causes the driver element 7 to urge against the side wall 9 which causes the platten 8 to bend at elbows 5 and causes displacement of the top and bottom walls 13 in the axial direction (a direction orthogonal to the transverse axis of the driver element 7). This displacement simulates the action of a mechanical spring.

In order to withstand repeated flexure with minimal degradation, platten 8 is preferably fabricated from a rugged material such as brass, titanium, platinum or steel that exhibits appropriate strength, stiffness, conducting and compliancy properties. Although not required a transducer/housing interface 6 may be disposed between the sidewall 9 and the driver element 7 for absorption purposes. The transducer/housing interface may be constructed by adhesive bonding or electroding.

Figure 1C:
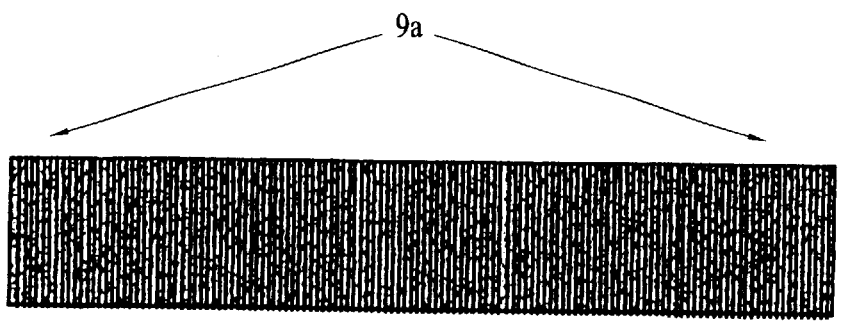
FIGS. 1C and 1D illustrate different examples of a driver element.
Figure 1D:
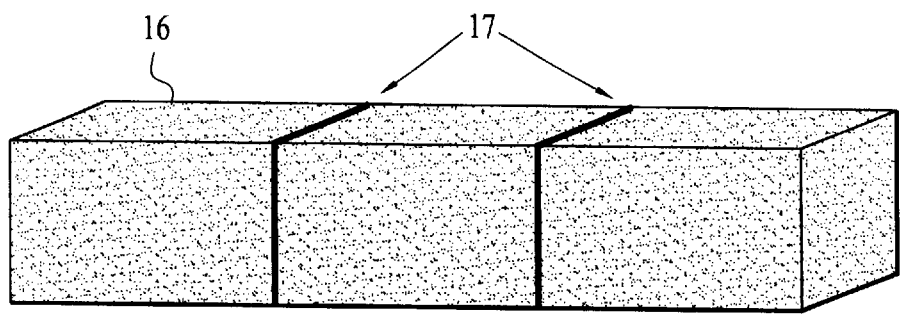

In a preferred embodiment the transducer of driver element 7 may comprise cofired PZT or PMN stacks 9a or magnetostrictive rods as illustrated in FIG. 1C. The driver element 7 may further comprise a single transducer or a plurality of arrayed transducers 16. Each transducer 16 is preferably separated by partition blocks 17 as depicted in FIG. 1D. Partition blocks 17 are preferably constructed from a rugged material such as titanium to minimize fretting in the joint interface between 16 and 17.

Figure 2A:
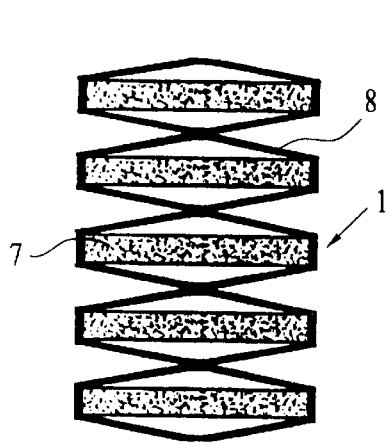
FIG. 2A illustrates flextensional cells stacked in symmetrical alignment.
Figure 2B:
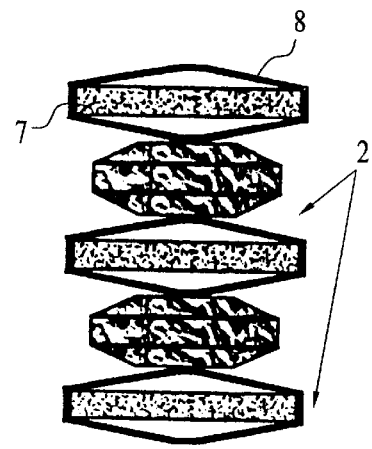
FIG. 2B illustrates flextensional cells stacked orthogonal to each other.

In accordance with another embodiment of the invention, a flextensional transducer assembly is provided that comprises a plurality of stacked flextensional cells 1. FIG. 2A shows a flextensional transducer assembly wherein the flextensional cells 1 are stacked in symmetrical alignment. FIG. 2B illustrates a flextensional transducer assembly wherein the flextensional cells 1 are stacked orthogonal to each other. The stacked configuration provides amplification of the transverse motion of driver elements 7 to obtain larger displacement of the flextensional cells in the axial direction. As opposed to combining multiple mechanical springs in series, the flextensional transducer assembly of FIGS. 2A and 2B may be multicell unitary devices manufactured from, e.g., a single block of material. Accordingly, the flextensional transducer assembly of this embodiment may replace combination, series connected mechanical springs typically used in a myriad of devices such as isolation mounts, acoustic generators or vibration/noise attenuation systems.

Figures 3A, 3B, 3C:
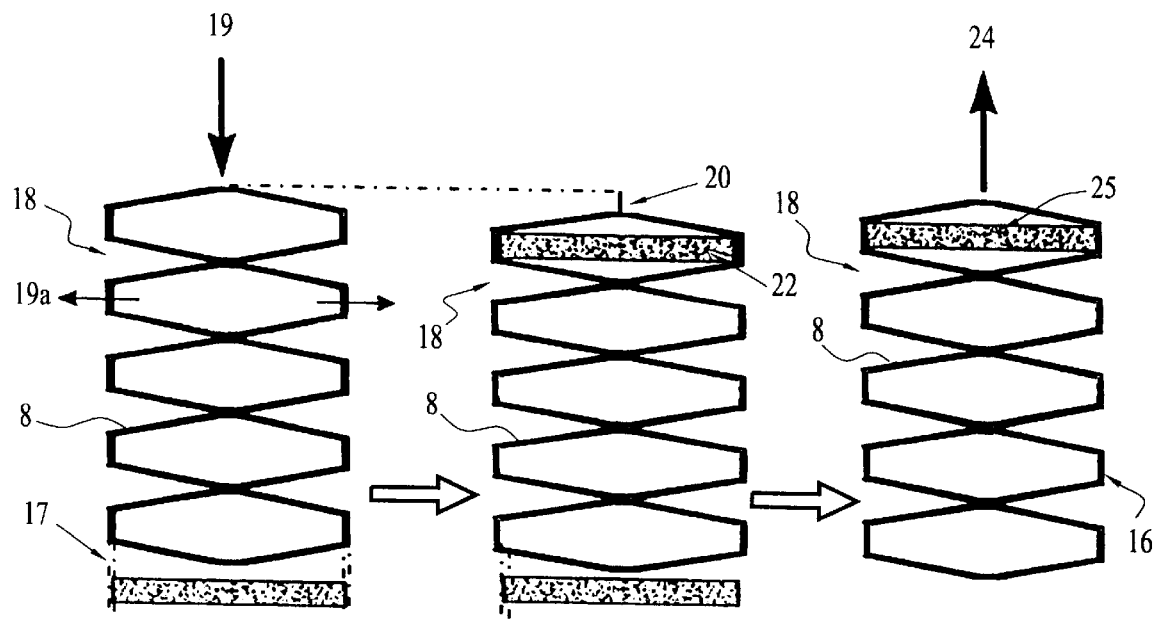
FIGS. 3A, 3B, and 3C illustrate a method for loading a driver element into a platten.

Turning to manufacturing concerns, in accordance with the invention, a process for making flextensional transducer assemblies is described. First, a single block of material (titanium, brass, steel or like rugged material) is selected. The block may then be fabricated using Electrical Discharge Machining (EDM) techniques into a desired geometry (single cell or multicell) to form a platten structure. EDM yields a multicell platten structure 18 that is unitary and free of discontinuities. Further, the multicell platten structure 18 does not require bolts or other attachment devices to attach individual flextensional cell plattens to each other. A multicell platten structure 18 is shown in FIG. 3A. The platten 8 of each individual flextensional cell 1 is preferably fabricated so as to be undersized in relation to the driver element 7. An axial load 19 may be applied to urge each platten 8 to widen laterally in the direction of arrows 19a. The length of the driver element 7 and the planar geometry of the individual plattens 8 are chosen to enable the driver element 7 to be slotted into place. The driver element 7 may be slotted when the axial load is increased to a desired amount 20 shown in FIG. 3B. Once the transverse dimension of platten 8 is larger than the length of the driver element 7, the driver element 7 may be readily slotted into place. As shown in FIG. 3C, the axial load 19 impinging on the platten structure 18 may be slowly released. The platten structure then springs back to its pre-load state and the driver elements 7 are now mechanically captured under compression.

Figure 3D:
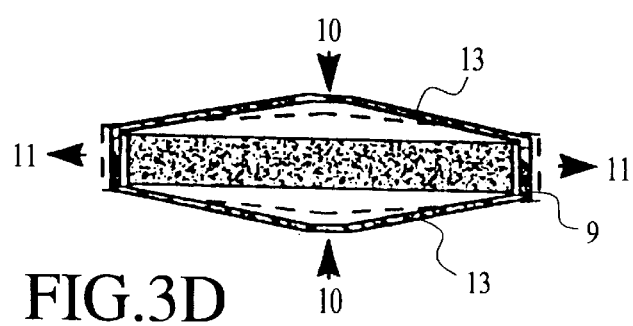
FIG. 3D illustrates the relational movement of the platten by the driver element.

In operation the driver element 7 expands during the positive cycle of an AC voltage applied to create a field across each individual transducer. This causes the sidewalls 9 of the platten 8 to move outward at the driver element axis as shown by the arrows 11 in FIG. 3D. The outward motion of the driver element 7 causes the top/bottom walls 13 of the flextensional transducer assembly to move inward as shown by the arrows 10 with an amplified displacement approximately equal to the ratio of the major to the minor dimensions of the platten 8. On a negative cycle, driver element 7 moves inward. Likewise in FIGS. 3A, 3B and 3C, because the platten structure 18 includes significant pre-loading, the compression will cause the platten sidewalls 9 to correspondingly move inwards and platten top/bottom walls 13 to move outward in the direction of arrow 24 of FIG. 3C.

Figure 4:
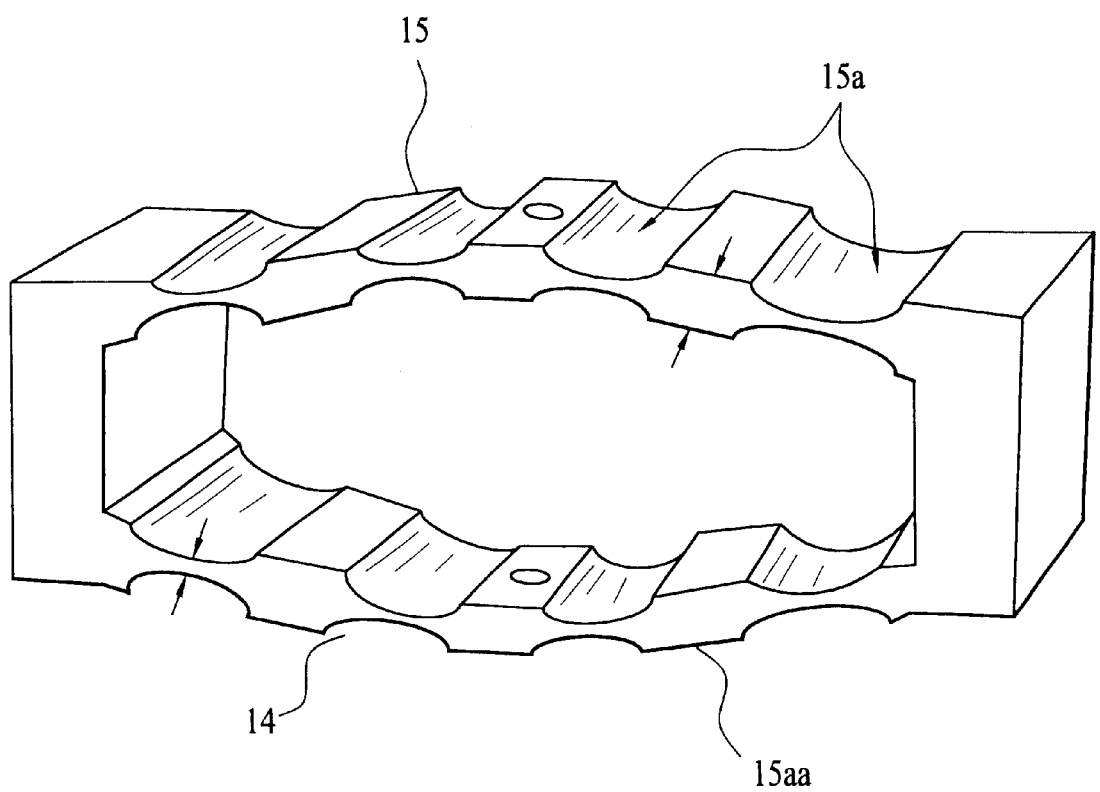
FIG. 4 illustrates another preferred embodiment of the invention.

In keeping with the invention, a further embodiment of the flextensional transducer assembly is described in accordance with FIG. 4. A corrugated platten 21 for a single flextensional cell 1 is depicted. The inner surface 14 and the outer surface 15 of both the top and bottom walls 13 preferably include a plurality of opposing corrugations 15a that function as flexure hinges. The optional position, arrangement and size of the corrugations for strength and flexure capabilities 13 is preferably determined using conventional finite element analysis. Such analysis may be performed by standard calculation software of the type known to those of skill in the art. However, in the embodiment depicted, the thickness of the top and bottom walls 13 at the trough of the corrugations 15a is about 1 mm and the wall thickness at interface 15aa between respective troughs 15a is about 3 mm. The corrugated platten 21 of FIG. 4 may also be provided with a driver element 7 preferably comprised of a plurality of piezoceramic stacks separated by titanium partition blocks. More preferably, the driver element 7 may be comprised of a cofired multilayer ceramic operating in the $d_{33}$ mode or a monolithic material operating in the $d_{31}$ mode such as that depicted in FIG. 1C. In either case, the corrugated platten 21 of FIG. 4 is designed to provide near ideal amplification. Although stiffer than a standard flexural platten design with the same weight/volume of material, the corrugated platten provides substantially higher performance in tests. The unloaded and dc properties of the corrugated platten versus platten design of FIG. 1B are illustrated in FIG. 5. As shown, corrugated platten 21 has almost twice the axial displacement of the design of FIG. 1B.

Figure 6:
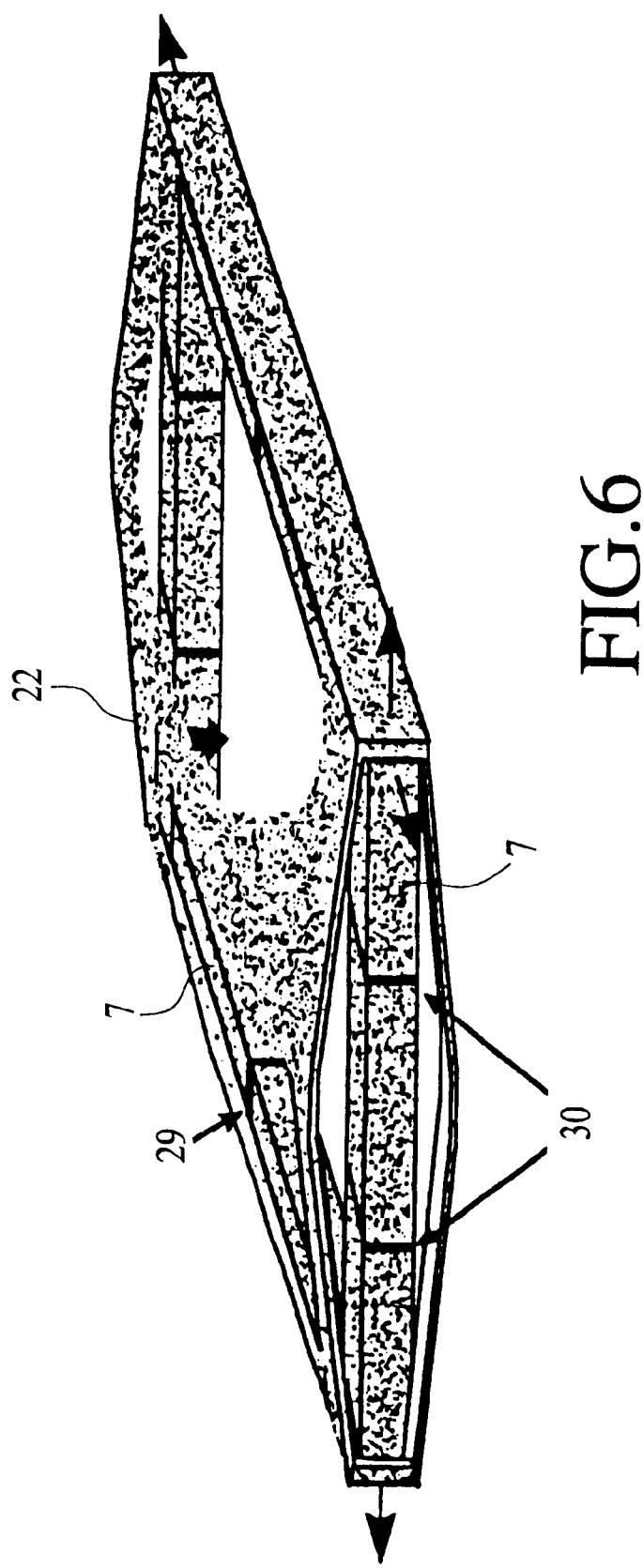
FIG. 6 illustrates another embodiment with a selective removal of part of the upper portion of the platten to show the internal arrangement of an array of driver elements.

In accordance with a further embodiment of the invention, a flextensional transducer assembly is described having an array of driver elements 7. More particularly, FIG. 6 depicts a flextensional cell 22 having a platten configuration of the embodiment depicted in FIG. 1A but with a plurality of arrayed driver elements 7. For example, the driver elements 7 may be arranged in a square configuration to yield two-dimensional actuator action. FIG. 6 depicts a first driver element 7 including partition block 30 disposed parallel to the transverse axis of the flextensional cell 22. A second driver element 7 including partition blocks 29 is disposed perpendicular to the first driver element 7

Figure 7:
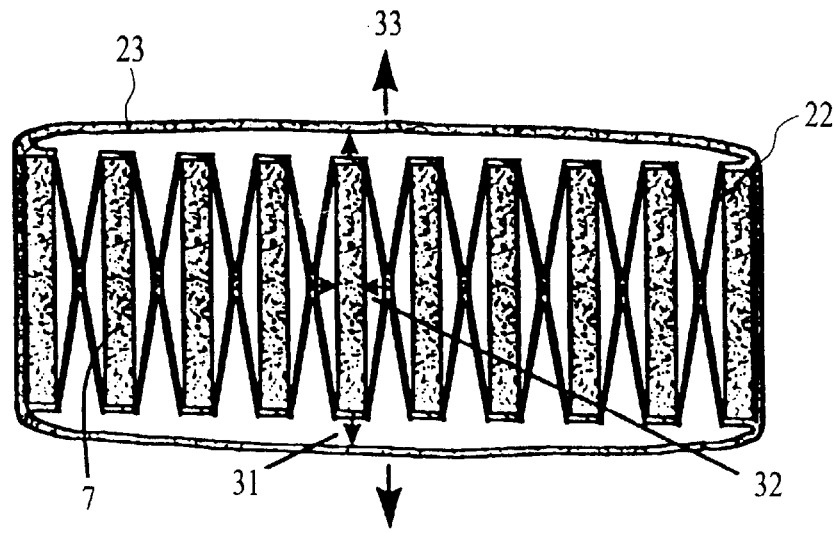
FIG. 7 illustrates a double amplified cell embodiment of the invention.

The forgoing embodiment may be realized in a multicell configuration so as to achieve double amplification. As depicted in FIG. 7., the flextensional transducer assembly includes a plurality of stacked cells 22 stacked in the manner described in connection with FIG. 2A. However, each cell includes an array of driver elements as described in connection with FIG. 6. The stacked cells 22 may be disposed within a housing 23. Arrow 31 indicates the axial strain direction of the driver elements 7. The motion caused in the individual cell walls induces a corresponding amplified motion in the axial strain direction of the inner plattens shown by arrow 32. As such, a doubly amplified axial strain may be induced in the outer platten sidewalls in a direction shown by arrow 33.

Figure 8:
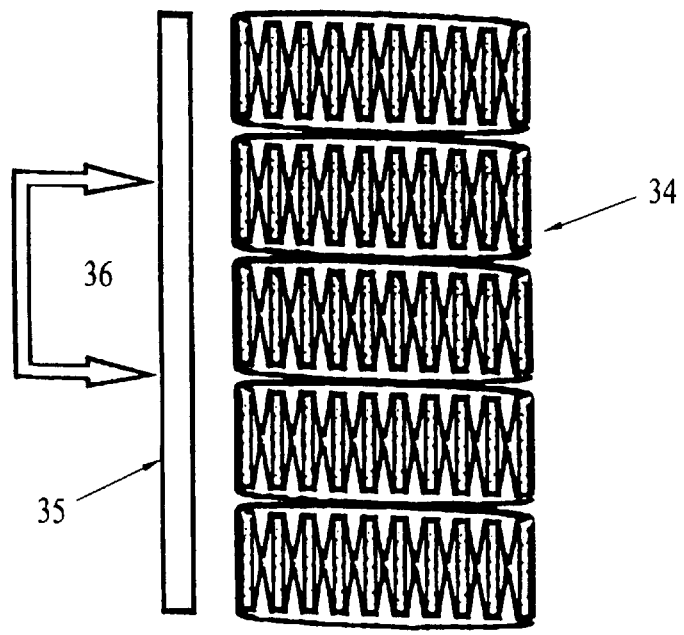
FIG. 8 illustrates a plurality of stacked double amplified cells depicted in FIG. 7.

For larger motion applications, the flextensional transducer assembly depicted in FIG. 8 may comprise a plurality of stacked supercell elements 34. Each supercell element preferably comprises a double amplified cell of FIG. 7. The flextensional transducer assembly of FIG. 8 may also comprise a rigid bar 35 to provide for uniform loading shown by arrow 36.

Figure 9A:
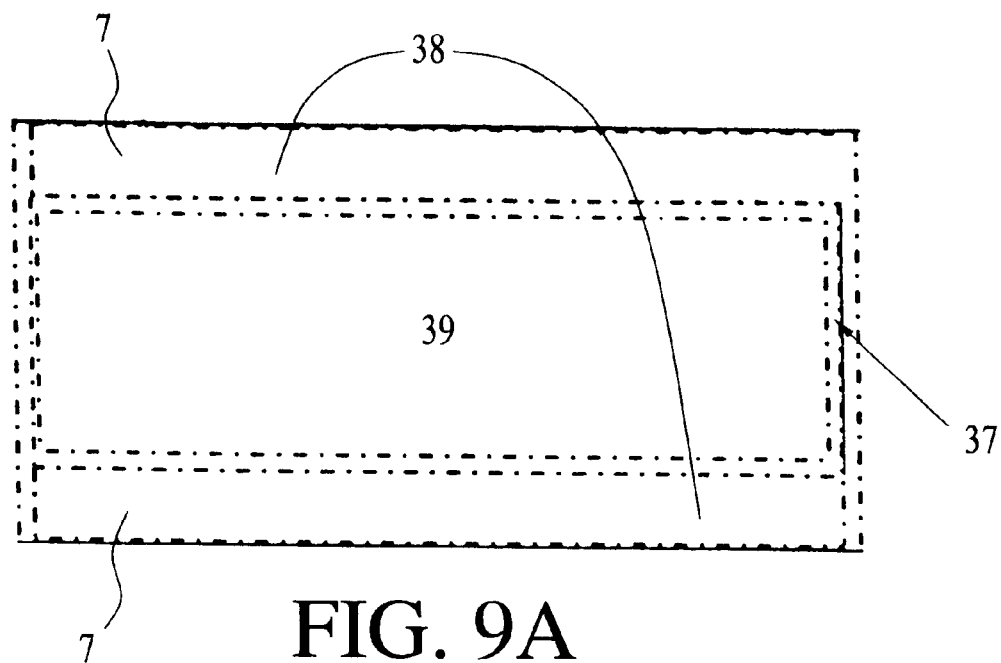
FIGS. 9A and 9B illustrate another embodiment of the invention having internal drive electronics.
Figure 9B:
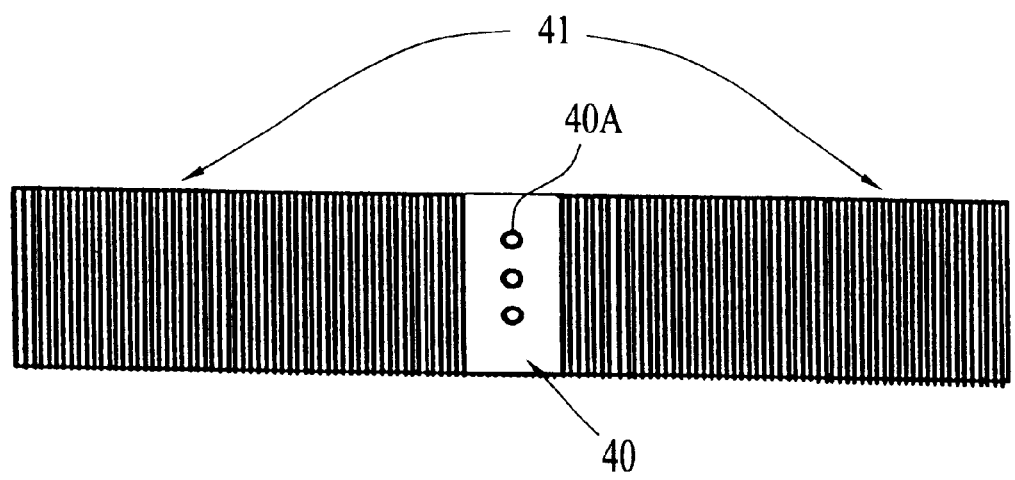

All flextensional transducer assemblies employing voltage activated driver mechanisms must be provided with an electronics driver to provide commanded AC signals. In accordance with a still another embodiment of the invention, a flextensional transducer assembly 37 is provided that includes embedded drive electronics such that the drive electronics and the driver element form a unitary structure. As illustrated in FIG. 9A, an embedded microdriver 39 may be mounted in the transducer transverse plane in parallel with one or more driver elements 38. Each driver element 38 preferably includes a partition block 40 depicted in FIG. 9B. Such a partition block is preferably milled and drilled before mechanical mounting and it is designed to enable access of metallic spacer and wire extrusion (ground, $VDC_{in}$, command signal) through terminals 40a. In the embodiment illustrated in FIG. 9A, partition block 40 is a center partition block that separates two piezoceramic stacks 41 operating in $d_{33}$ mode. Microdriver 39 preferably comprises a standard piezo ceramic driver current of the type known to those of skill in the art. Microdriver 39 may be located symmetrically between the front and rear driver elements 38 with the microdriver 39 and the driver elements 38 all lying on the same plane orthogonal to the axial axis. Microdriver 39 preferably is connected to partition block 40. Accordingly, a unitary self-contained flextensional transducer may be fabricated on a single board. In keeping with the present invention, the ability of partition blocks to be machined enables a new class of devices that incorporate one or more traverse members, e.g., rods, cables or fibers, that are capable of unidirectional free motion in the axial direction caused by energization of the transverse drive elements of the mechanism.

Figure 10:
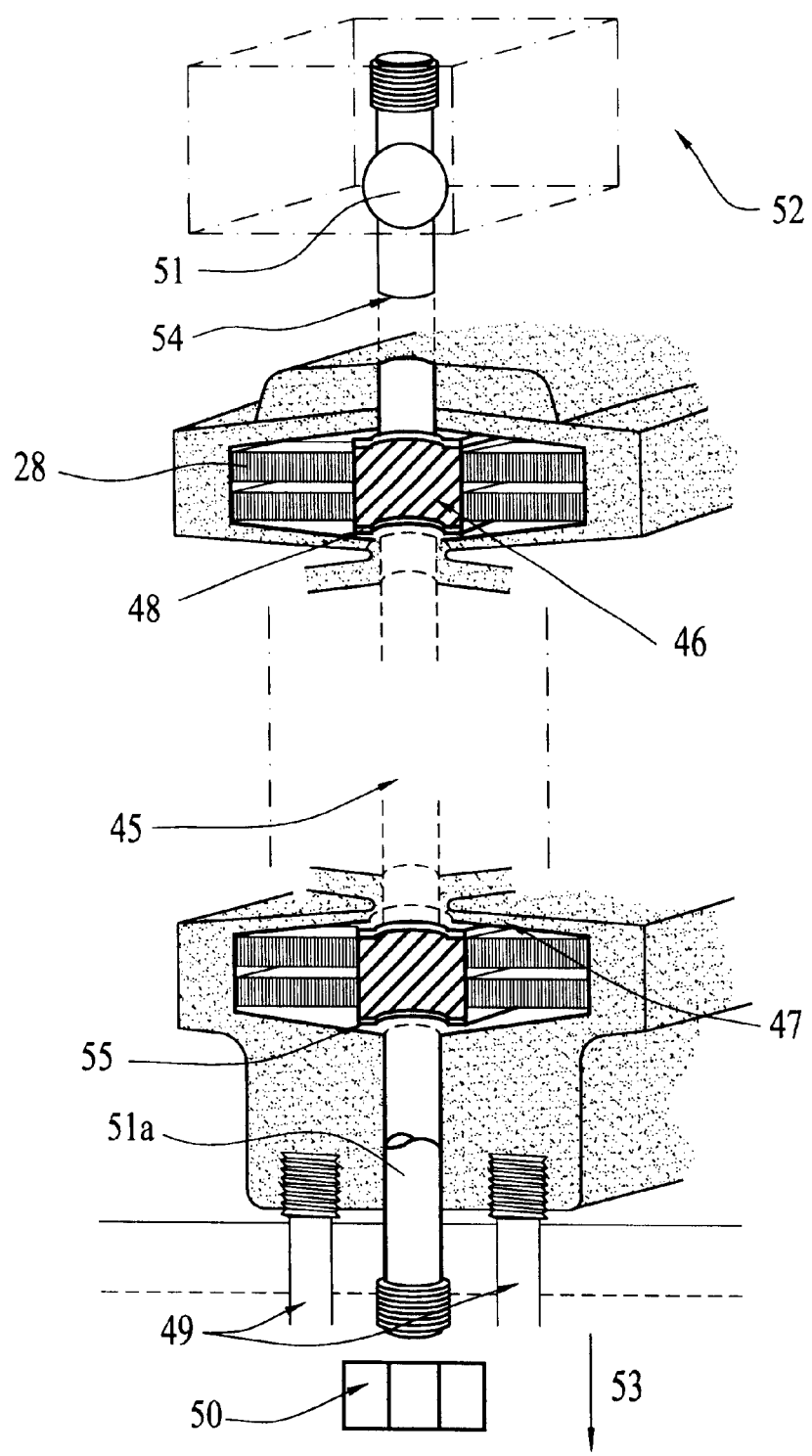
FIG. 10 illustrates an application of the invention with a traverse member capable of free axial motion.

FIG. 10 illustrates a device for displacing a traverse member comprising a multicell embodiment of the flextensional transducer assembly that includes several vertically arranged, e.g., vertically stacked, high force/strain flextensional cells 45 (simultaneously wire EDM fabricated as one single homogeneous actuator housing). Each flextensional cell 45 preferably incorporates a single center-partition block 46 separating a 2×3 arrangement of $d_{33}$ multilayer transducer elements 28. The partition block 46 is drilled, milled or otherwise worked as to provide a hole 48, 55 to allow free axial motion of traverse member 51a. The platten geometry 47 may be chosen to enable up to a 12-fold strain amplification factor. Suitable platten geometry may be determined using conventional finite element analysis techniques as described above. The hole 48 has a radius that may be milled or drilled slightly greater than radius of the traverse member 51a so as to allow free axial motion of traverse member 51a. Attachment mechanism 49 is provided for securing the flextensional transducer assembly to a base 49a. Attachment member 49 may comprise bolts (as depicted in FIG. 10), clamps or slotting devices. The central purpose is that the attachment mechanism 49 be affixed to the structure or load 52 in such a way as to allow for free motion as illustrated by arrow 53. The converse end of the traverse member may be attached to the adjusting point 51. The attachment can be achieved in a variety of ways including clamping, threaded bolt, or as shown in FIG. 10 using an integral ball joint incorporated into the adjustable load to allow unconstrained axial motion of the traverse member and limited in-plane motion of entire assembly. An optional center traverse retainer 54 can be incorporated to eliminate bending and provide alignment. An elastomer "hard" stop 50 can also be included for asymmetric loading and sudden transient overload conditions.

During the positive cycle when the transducer elements 28 are energized they move outward. This induces an amplified compression of each individual flextensional cell 45 in the multicell vertical array. The sum of these individual flextensional cell platten compressions will provide for total mechanism compression. As the device compresses, the center traverse member 51a is free to travel in the downward direction and will traverse in the direction indicated by arrow 53. The force to push the traverse member downwards, in this case, is provided by the load 52 affixed at the converse or upper end of the embodiment. Other causes for the traverse member to traverse may be back pressure, spring, dead weight, and an opposing but identical mechanism that is driven in opposite phase to the one shown in FIG. 10. During the negative cycle, the individual plattens "spring back" as allowed by the compression of the driver elements 28 in each cell of the device. In the embodiment depicted in FIG. 10 the traverse member is attached to the "floating" or "isolated" load 52. As such, when the load 52 is pushed in the upward direction opposite to that of arrow 53 it causes the traverse member to have motion in a direction away from the attachment member 49.

Figure 11:
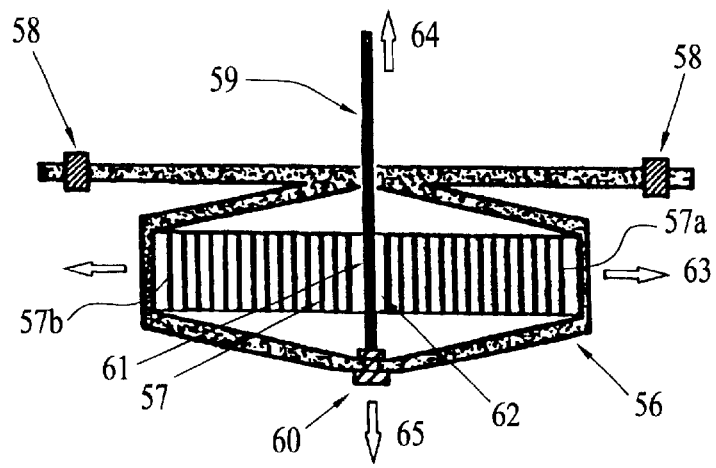
FIG. 11 illustrates another application of the invention in a needle nose valve controller.

As seen in FIG. 11, the traverse member 59 may also be affixed directly to the flextensional cell 56 itself rather than a floating external load. In this embodiment the flextensional transducer assembly is implemented in a needle nose valve controller. The platten 56 is preferably (EDM) fabricated or milled from single block piece of material (metal block). The platten 56 may be mechanically loaded with a driver element 57a including one or more pairs of transducers 57b separated by partition blocks 57 (shown as a line). An upper rail 58 may be affixed to a secondary structure and held rigidly in place in an arbitrary orientation. The traverse member 59, preferably a center rod, may be allowed to pass freely through the rail end of the device. However, the other end of the traverse member 59 is preferably rigidly affixed to the opposite side of the platten by fastener 60. A sleeve bearing 61 may be used to assist the motion of the traverse rod through the center partition block 62.

During the positive cycle when the driver element 57a is energized, and, responsive to such energization, move outward in direction indicated by arrow 63. This induces an amplified compression of the flextensional cell in the axial direction shown by arrow 64. As the device compresses the center traverse member 59 which is affixed at the opposite end to upper rail 58 must, of necessity travel in the rail direction also. During the negative cycle, the platten 56 "springs back" as allowed by the compression of the driver element 57a in each cell of the device. As the traverse member 59 is rigidly fixed to the platten 56, traverse member 59 also travels in a direction indicated by arrow 65. The traverse member 59 has a combined motion in the axial direction of the embodiment in response to an AC energization of the driver element 57a.

Figure 12:
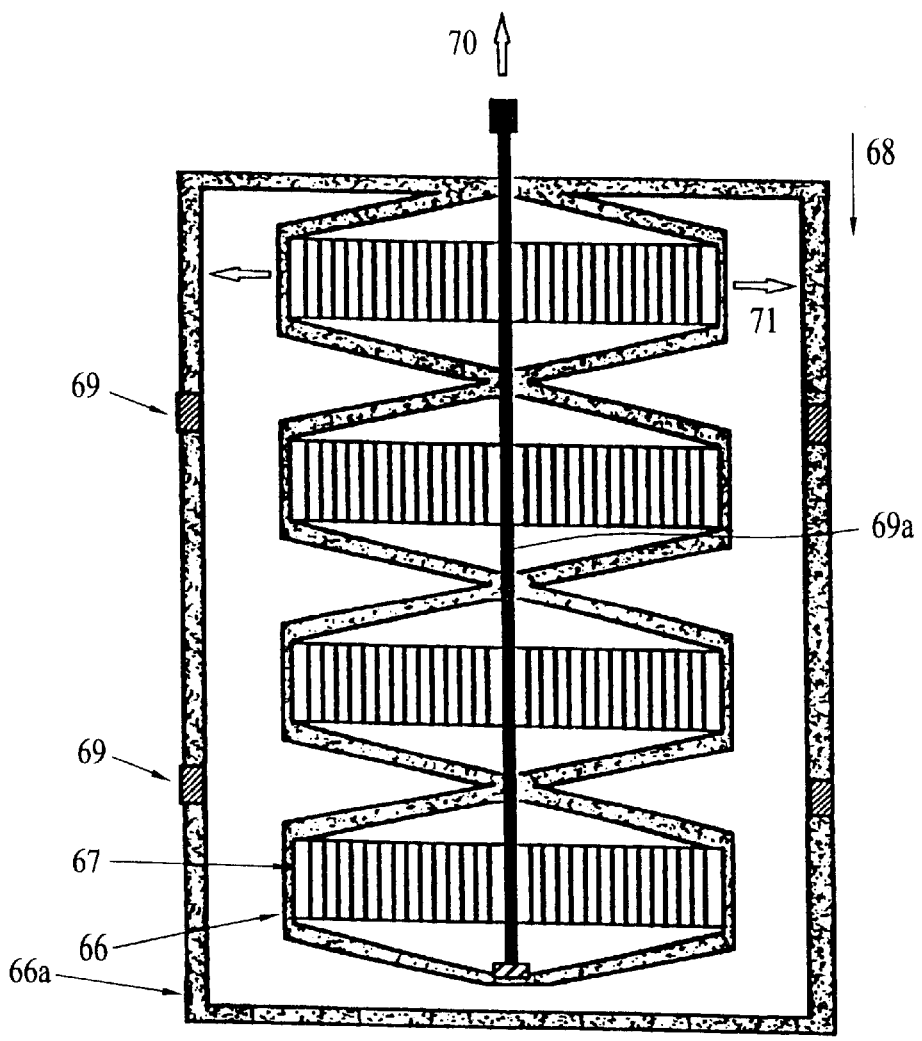
FIG. 12 illustrates a multicell configuration of the device depicted in FIG. 11.

A multicell configuration of the device depicted in FIG. 11 is shown in FIG. 12. Here a plurality of flextensional cells 66 are stacked and disposed within a canister 66a. The entire canister 66a and flextensional cell assembly is preferably (EDM) fabricated as a single piece. The driver elements 67 are preferably mechanically loaded by causing an axial load in a direction indicated by arrow 68. The canister may be rigidly affixed, as for example by the symmetric attachment points 69. The motion of the traverse member 69a in the direction of arrow 70 is as described in FIG. 11; however, the force associated with the motion is greater than that generated by the device of FIG. 11.

Figure 13:
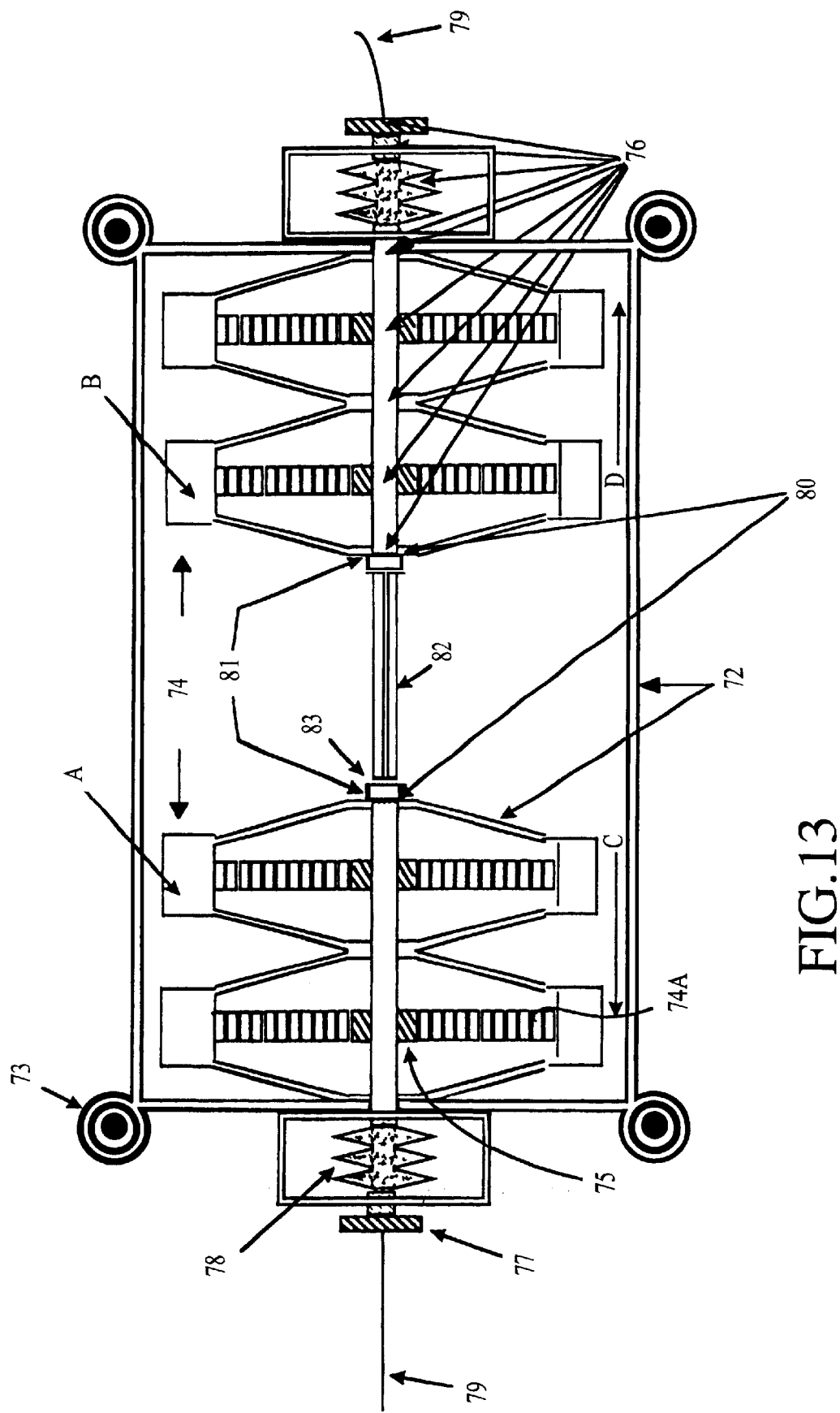
FIG. 13 illustrates another application of the invention having opposing two-cell flextensional transducer assemblies.

The embodiments of FIGS. 11 and 12 may be modified to cause a rod, cable or fiber to be stretched. FIG. 13 depicts such a modification. Two opposing single or multicell flextensional transducers assemblies may be incorporated into a canister or cage arrangement as shown in FIG. 13. The opposing two-cell flextensional transducer assembly housing along with the cage 72 and fixturing locations 73 are all preferably (EDM) manufactured from a single block of material. The material remaining may form a continuous and contiguous frame. Opposing flextensional cells A and B may be mechanically loaded, respectively, in the directions of arrows 74 to enable mechanical loading of respective driver elements 74a in each flextensional cell of the opposing pair of two-cell flextensional transducer assemblies shown. Each driver element 74a preferably comprises a series parallel arrangement of transducers that includes a center block partition 75. The center partition 75, frame ends, platten faces as well as any additional fixturing such as the optional threaded pre-compression 77 or optional Belleville washer 78 fixture shown in this embodiment of FIG. 13 each contain an orifice or hole 76. The holes 76 may be aligned to allow a traverse member 79, e.g., a rod, cable or fiber to be slotted lengthwise through the entire assembly. The traverse member 79 may be captured at opposing openings of the two-cell flextensional transducer assemblies at point 80. A capturing device 81 is provided to facilitate such capture. Capturing device 81 may be an adhesion bond or a clamp such as a shape memory alloy ferrule clamp. Such clamps are also useful in optical fiber to optical fiber connections using the phase change properties of the shape memory metal under temperature variation, such as connecting the signal out fiber to external opto-electronic devices. The uncaptured portion of the traverse member 79 between the two opposing flextensional transducer subassemblies may optionally be damped using fluidic or viscoelastic treatment 82 alone or in combination with bellows 83 as shown in FIG. 13.

In operation, opposing flextensional cells A and B each operate in compression when their respective transducers are energized during the positive voltage cycle. Accordingly flextensional cells A and B exert pulling forces on the traverse member in the directions of arrows C and D, respectively. As the traverse member 79 is captured between fixturing points 81, it necessarily must stretch by an amount equal to the total axial displacement of both flextensional cell A and flextensional cell B. During the negative cycle, the two opposing flextensional cells A and B "spring back" as allowed by the compression of the transducer elements in each cell. As the traverse member 79 is rigidly fixed at location 81 it correspondingly relaxes, or even goes into compression (depending upon the embodiment). The amount of the relaxation of traverse member 79 between the two fixed points 81 may be equal to the sum of the recovery displacements of flextensional cell A and flextensional cell B. It should be observed that the entire assembly, known as a flextensional stretcher, can optionally be fabricated as a low profile package.

Figure 14:
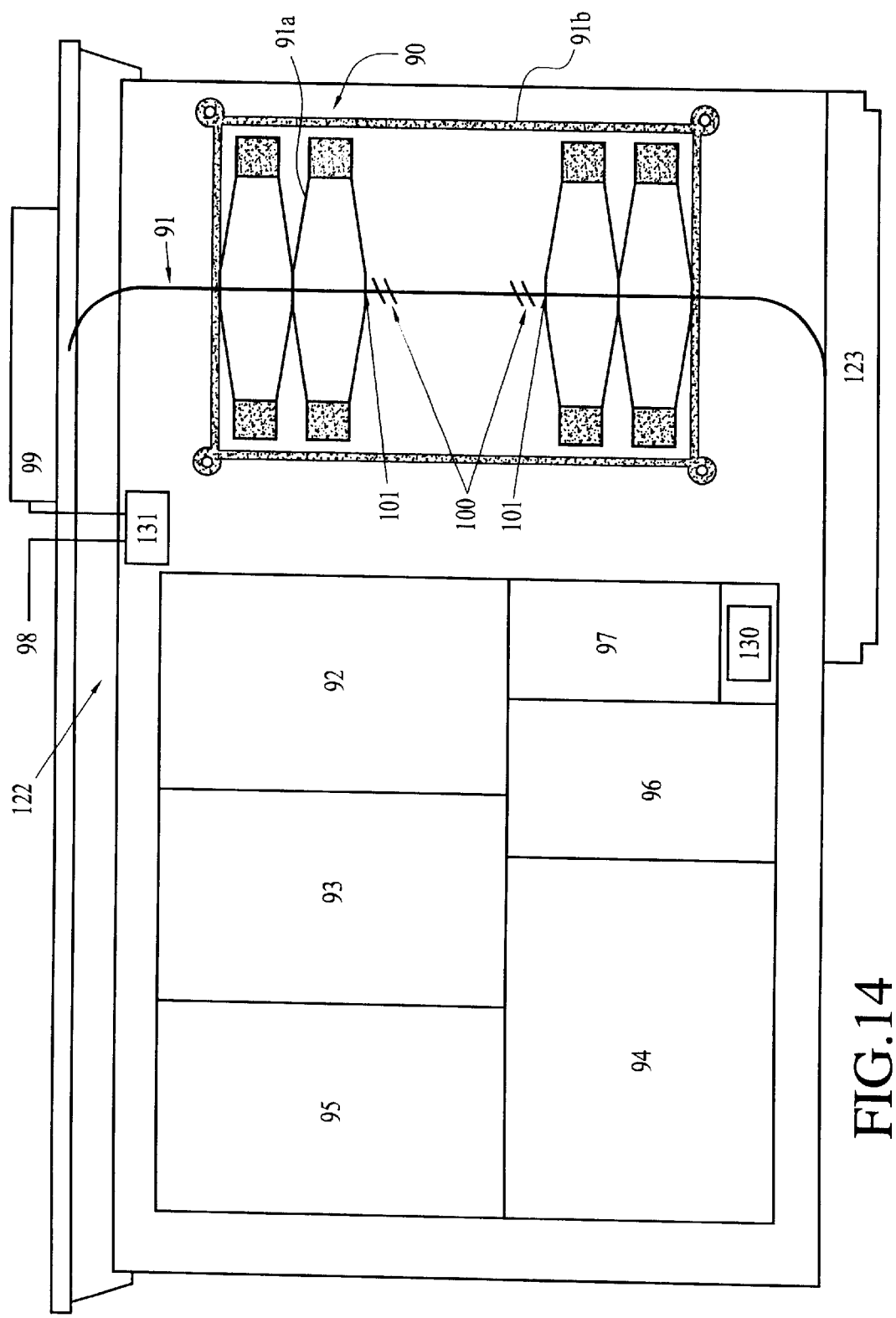
FIG. 14 illustrates the device of FIG. 13 integrated into a single VME board integrated tunable fiber laser system.

Many variations of the embodiment described in FIG. 13 are contemplated by the invention. For example, the device of FIG. 13 may be modified to stretch Bragg grated fiber and perform wave division multiplexing (WDM), filtering or laser tuning. In addition, the device of FIG. 13 may be integrated into a single VME board integrated tunable fiber laser system as illustrated in FIG. 14. This embodiment includes a fiber stretcher 90 having machined center blocks, mechanical assembly, and compression operation of the driver elements to stretch a traverse fiber 91 as shown in FIG. 14. Such fibers may include erbium-doped fiber at 1550 nm for hydrogen detection or neodymium doped fiber at 980 nm for detection of water vapor absorption lines. As described in connection with the foregoing embodiments, in the previous art, the flextensional cell plattens 91a and cage 91b are preferably simultaneously fabricated from single block of material through EDM processing. The cage 91b is preferably comprised of a rugged material such as inconel, titanium or brass. The fiber signal may be driven by a pump laser diode 92 that preferably incorporates a laser current control function and a photodiode feedback function. Pump laser diode 92 is powered by a pump laser diode assembly 93 that together with the pump laser diode 92 may be mounted on the same board, e.g., a single slot width VME board 121. Advantageously, external power, ground and command signals may be supplied via standard VME back plane connector 123. The flextensional stretcher mechanism may be driven by an on-board (as shown in FIG. 14) or external piezo-microdriver 94 and power regulator 95 that also may be mounted on the same VME board.

The fiber signal is preferably connected to a wave division multiplexer 130 which may have a separate WDM laser pump diode and diode power supply 131 mounted on the VME board. The output of a wave division multiplexer 130 may be coupled to output opto-electronics 99 such as an optical time domain reflectometry system or a Bragg grated discrimination system that may include Faraday rotator mirrors and Q-switching devices.

Specifically, an external reference signal 98 may be coupled to an opto-electronic device 99 such as an externally mounted optical time domain reflectometry or Bragg grated discrimination system that may incorporate Faraday rotator mirrors and Q-switching. For applications such as water vapor absorption line detection, a board mounted Q-switch 96 and board mounted harmonic controller 97 may be provided. Q-switch 96 and harmonic controller 97 may be mounted directly on the VME board.

A command signal applied to the flextensional cell assembly 90 causes energization of the individual flextensional cells 91a from a high-power AC signal provided by external piezo-microdirver 94 and power regulator 95. The corresponding amplified motion in the axial direction of the dually opposed flextensional cell assemblies causes the stretcher to lengthen the Bragg grated fiber 100, between the two fixture points 101 that rigidly capture the fiber. The fiber signal may be connected to a wave division multiplexer 130 which may have a separate WDM laser pump diode and diode power supply 131. In the illustrated embodiment, reference signal 98 is connected to diode power supply 131. The output of wave division multiplexer 130 is preferably connected to opto-electronic device 99.

Figure 15:
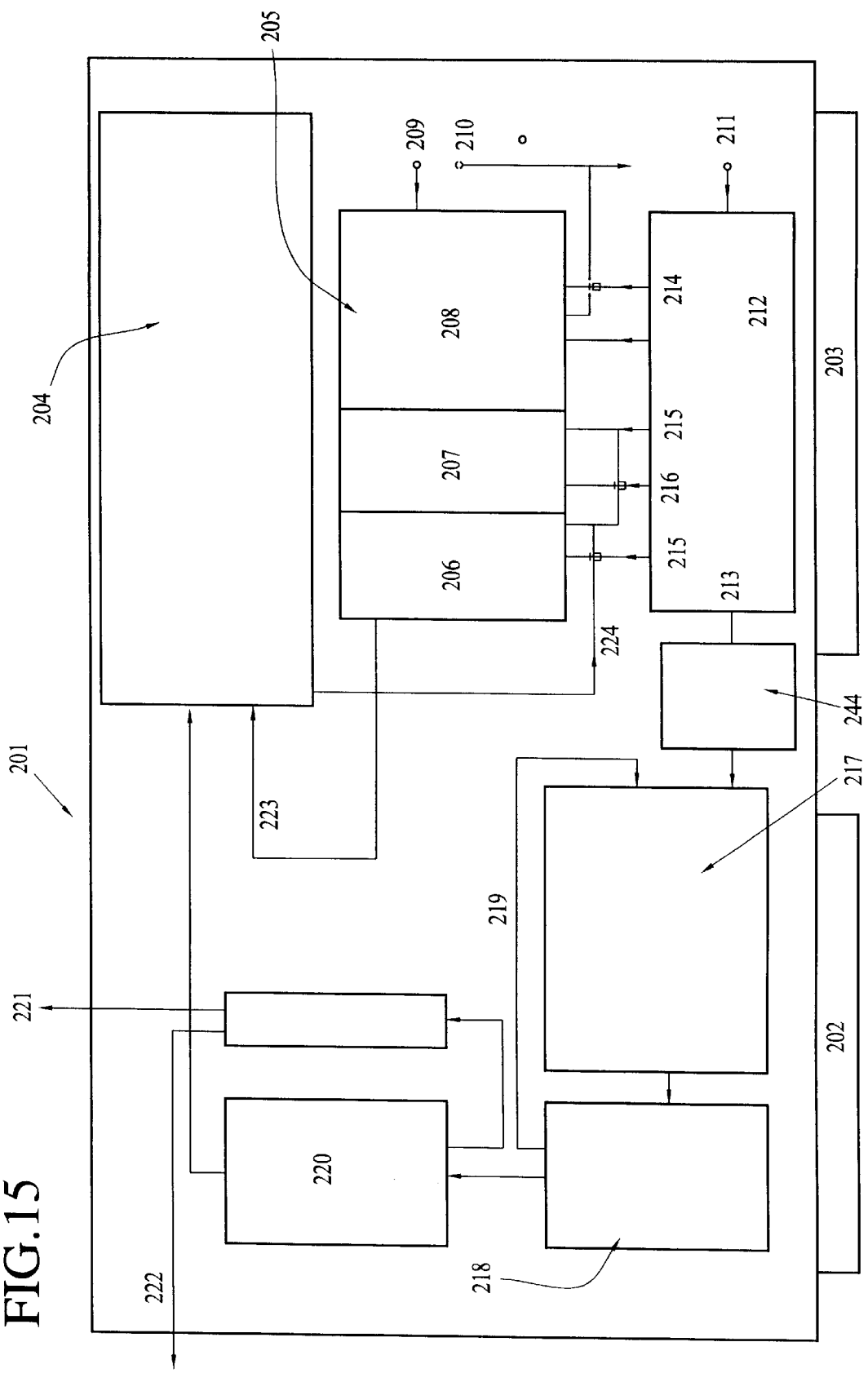
FIG. 15 illustrates a VME/VXI board based upon the device depicted in FIG. 14.

FIG. 15 shows a preferred VME/VXI board embodiment of the tunable fiber laser system based upon the dually opposed flextensional transducer assembly system of FIG. 14. The VME/VXI board 201 includes a front edge I/O that normally faces outward on a rack mounted system. The connector/expansion 202 and the edge connector/main 203 may be available for external feeds and power. The tension or tension-compression fiber laser assembly 204, (depicted in FIG. 14 as element 90) may be powered by an on-board piezoelectric amplifier 205 having a power stage 206, level shift and driver stage 207 and local low voltage supplies and analog signal input/filtering and feedback conditioning section 208. An external command signal 209 may be input to feedback conditioning section 208. An external power signal 211, e.g., 28 DC volts, is preferably input to a power conditioning section 212. The power conditioning section 212 provides several power levels including low voltage feed 213 to the laser pump drive, low voltage feed 214 to the analog signal input/filtering and feedback conditioning section 208, high level drive voltage 215 to the amplifier 205 and power stage 206, and offset voltage 216 to level shift and driver stage 207. The feed 213 may be used to drive laser post regulator 244, which in turn couples to the pump laser diode control electronics section 217. The pump laser diode control electronics 217 may be coupled to a pump laser diode assembly 218 which, in turn, transmits the feed 213 to wave division multiplexer 220. Feedback signal 219 may be transmitted from pump laser diode 218 back to pump laser control electronics 217. The wave division multiplexer 220 couples into both the fiber stretcher assembly 204 and the transmit/receive control system 221. The laser output 222 may be generated by transmit/received control system 221. The power stage 206 preferably generates and transmits high voltage drive signal 223 to the fiber stretcher 204. Where capacitive transducer elements are driven in the fiber stretcher assembly 204, a return charge signal 224 is transmitted to power stage 206.

What is claimed is:
1. A flextensional transducer assembly comprising:
a flextensional cell having:
   a platten including first and second side walls, a top wall and a bottom wall, each wall having an inner surface and an outer surface, the inner surface of the top wall intersecting with the inner surface of the side wall to form an elbow at the intersection point, and
   at least one active mechanical driver element disposed within the platten, said active mechanical driver element comprising first and second active portions and a passive partition block disposed between the first and second active portions, the passive partition block including means for enabling wiring to pass through the partition block for termination elsewhere in the assembly, the partition block being unattached to the platten.

2. A flextensional transducer assembly comprising:
a flextensional cell having:
   a platten including first and second side walls, a top wall and a bottom wall, each wall having an inner surface and an outer surface, at least one of the inner and outer surfaces of the top and bottom wall including a plurality of hinge points; and
an active mechanical driver element disposed within said platten contiguous to the first and second side walls, said active mechanical driver element urging against the first and second sidewalls responsive to a driving voltage causing displacement of the top and bottom walls in a direction orthogonal to the direction of movement of said active mechanical driver element.

3. A flextensional transducer assembly comprising:
a first flextensional unit including first and second stacked flextensional cells, each flextensional cell having an aperture disposed therein;
a second flextensional unit spaced from and disposed opposite to said first flextensional unit, the second flextensional unit including first and second stacked flextensional cells, each flextensional cell having an aperture disposed therein, the apertures of the flextensional cells of the first flextensional unit being in alignment with the apertures of the flextensional cells of the second flextensional unit;
a housing enclosing said first and second flextensional units, said housing including first and second side walls, the first and second side walls each including an aperture that is aligned with the apertures of the flextensional cells;
a traverse member extending through from one end of said housing through the other end of said housing and passing through the apertures in the housing side walls and the apertures in the flextensional cells of the first and second flextensional units; and
a capture mechanism disposed on at least one of said flextensional units to prevent sliding of the traverse member through the at least one flextensional unit.

4. A flextensional transducer assembly comprising a plurality of stacked flextensional cells of claim 1 wherein the stacked flextensional cells form a unitary structure.

5. The flextensional transducer assembly of claim 1 wherein said active mechanical driver element includes a piezoceramic stack.

6. The flextensional transducer assembly of claim 5 wherein said active mechanical driver element includes a cofired PZT stack.

7. The flextensional transducer of claim 5 wherein said active mechanical driver element includes a cofired PMN stack.

8. The flextensional transducer of claim 1 wherein said active mechanical driver element includes a magnetostrictive rod.

9. The flextensional transducer assembly of claim 2 wherein said active mechanical driver element includes a piezoceramic stack.

10. The flextensional transducer assembly of claim 2 wherein the top wall has a first thickness and the bottom wall has second thickness and each hinge point includes a trough having a third thickness, the third thickness being less than the first and second thicknesses.

11. The flextensional transducer of claim 10 wherein the first and second thickness is about 3 mm and the third thickness is about 1 mm.

12. The flextensional transducer of claim 2 wherein said active mechanical driver element includes a magnetostrictive rod.

13. The flextensional transducer assembly of claim 3 wherein each flextensional cell includes a platten having first and second side walls, a top wall and a bottom wall, each wall having an inner surface and an outer surface, the inner surface of the top wall intersecting with the inner surface of the side wall to form an elbow at the intersection point, and an active mechanical driver element disposed within the platten, the driver element including first and second active portions and a passive partition block disposed between the first and second active portions, the partition block including an aperture to allow the traverse member to pass through in a direction orthogonal to the driver element.

14. The flextensional transducer assembly of claim 3 wherein the traverse member is captured at opposing openings of said first and second flextensional units.

15. The flextensional transducer assembly of claim 14 further comprising means for damping a portion of the traverse member disposed between the first and second flextensional units.

16. The flextensional transducer assembly of claim 3 wherein each flextensional unit forms a unitary structure.

17. The flextensional transducer assembly of claim 3 wherein the traverse member includes a fiber.

\* \* \* \* \*

UNITED STATES PATENT AND TRADEMARK OFFICE
CERTIFICATE OF CORRECTION

PATENT NO. : 6,465,936 B1  
DATED : October 15, 2002  
INVENTOR(S) : Knowles et al.

It is certified that error appears in the above-identified patent and that said Letters Patent is hereby corrected as shown below:

<u>Column 1,</u>
Line 7, insert -- This invention was made with Government support under Contract NAS1-00044 awarded by NASA. The government has certain rights in this invention. --

Signed and Sealed this

Fifth Day of August, 2003

JAMES E. ROGAN
*Director of the United States Patent and Trademark Office*